US005639210A

United States Patent [19]
Carpenter et al.

[11] Patent Number: 5,639,210
[45] Date of Patent: Jun. 17, 1997

[54] ROTOR BLADE OUTER TIP SEAL APPARATUS

[75] Inventors: Kevin D. Carpenter, Tequesta; John D. Wiedemer, Wellington; Paul A. Smith, Jr., Palm Beach Gardens, all of Fla.

[73] Assignee: United Technologies Corporation, Hartford, Conn.

[21] Appl. No.: 546,631

[22] Filed: Oct. 23, 1995

[51] Int. Cl.$^6$ .................................................. F01D 11/18
[52] U.S. Cl. ........................................ 415/135; 415/173.3
[58] Field of Search ................................ 415/134, 135, 415/136, 138, 173.1, 173.2, 173.3

[56] References Cited

U.S. PATENT DOCUMENTS

| | | | |
|---|---|---|---|
| 2,634,090 | 4/1953 | Hardigg | 415/135 |
| 4,050,843 | 9/1977 | Needham et al. | 415/136 |
| 4,177,004 | 12/1979 | Riedmiller et al. | 415/136 |
| 4,317,646 | 3/1982 | Steel et al. | 415/173.1 |
| 4,354,687 | 10/1982 | Holland et al. | 415/136 |
| 4,679,981 | 7/1987 | Guibert et al. | 415/173.1 |
| 4,863,345 | 9/1989 | Thompson et al. | 415/138 |
| 5,064,343 | 11/1991 | Mills . | |
| 5,080,557 | 1/1992 | Berger | 415/138 |
| 5,092,737 | 3/1992 | Lau . | |
| 5,104,287 | 4/1992 | Ciokajlo . | |
| 5,116,199 | 5/1992 | Ciokajlo . | |
| 5,154,575 | 10/1992 | Bonner . | |
| 5,167,487 | 12/1992 | Rock . | |
| 5,205,115 | 4/1993 | Plemmons et al. . | |
| 5,228,828 | 7/1993 | Damlis et al. . | |
| 5,261,228 | 11/1993 | Shuba . | |
| 5,267,831 | 12/1993 | Damiral . | |
| 5,330,321 | 7/1994 | Roberts et al. . | |
| 5,351,473 | 10/1994 | Shuba . | |

*Primary Examiner*—James Larson
*Attorney, Agent, or Firm*—Richard D. Getz

[57] ABSTRACT

A shroud for a rotor assembly disposed within a case is provided. The shroud includes suspension apparatus, a control ring, and a blade outer air seal. The suspension apparatus is disposed between the control ring and the case. The control ring includes a body and a first attachment mechanism. The blade outer air seal includes a second attachment mechanism. The first and second attachment mechanisms cooperate to secure the blade outer air seal to the control ring.

26 Claims, 5 Drawing Sheets

ROTOR BLADE OUTER TIP SEAL APPARATUS

The invention was made under a U.S. Government contract and the Government has rights herein.

BACKGROUND OF THE INVENTION

1. Technical Field

This invention relates to turbine engine rotor assemblies in general, and to blade outer tip seal apparatus in particular.

2. Background Information

A typical gas turbine engine includes a fan, compressor, combustor, and turbine disposed along a common longitudinal axis. The fan and compressor sections work the air drawn into the engine, increasing the pressure and temperature of the air. Fuel is added to the worked air and burned within the combustor. The temperature of the core gas flow increases as a result of the combustion. The magnitude of the increase depends upon several factors, including the amount of fuel added within the combustors. The combustion products and any unburned air, hereinafter referred to as core gas flow, subsequently powers the turbine and exits the engine producing thrust.

In most cases, the turbine comprises several stages each having a rotor assembly and at least one stationary vane assembly. The core gas flow causes the rotor assemblies to rotate, thereby enabling the rotor assemblies to do work elsewhere in the engine. The stationary vane assemblies located forward and/or aft of the rotor assemblies guide the core gas flow entering and/or exiting the rotor assemblies.

Under steady-state conditions at a given altitude, the power setting of an engine correlates to a particular flow rate of fuel injected into the combustors. The level Of thrust produced for the volume of fuel burned may be referred to as the "thrust specific fuel consumption" of the engine at that power setting. During transient periods, on the other hand, when the engine is accelerating from a first steady-state power setting to a second steady-state power setting, additional fuel is required to maintain the same level of thrust. Thus, the thrust specific fuel consumption of the engine decreases as well as the efficiency of the engine.

A significant cause of decreased engine efficiency is dissimilar thermal growth within the engine, for example between the blade tips of the turbine rotor assemblies and the shroud surrounding them. Core gas flow allowed to pass between the tips of the rotor assembly blades and the shroud does not cause the rotor assemblies to rotate and therefore does not add to the work done within the turbine. This undesirable extra clearance is most pronounced during rapid acceleration. Hard deaccelerations, on the other hand, can cause the shroud to contract more rapidly than the rotor assembly and potentially create an interference between the rotor blades and the shroud. Hence, there is a tension between minimizing the clearance between the blade tips and the shroud for performance sake, and maintaining clearance adequate to accommodate thermal expansion and contraction of the rotor assembly and shroud.

Performance aircraft powered by gas turbine engines require engines that are quick to respond to changes in the power setting of the engine. Power setting changes are typically accomplished by changing the fuel flow rate within the engine, although the method for determining maximum permissible changes varies. In some control schemes, the power produced by a turbine engine is limited by the core gas flow temperature within the turbine of that engine. Core gas flow temperature is used as a limiting factor to avoid exposing the turbine components to a temperature which would decrease the usable life of components below an acceptable level. Fuel flow rate, and therefore thrust produced, under a turbine temperature control scheme can be increased until maximum turbine temperature is reached.

A disadvantage of this approach is that the maximum possible thrust may not be available during a transient stage. During a hard acceleration, for example, the fuel flow may be increased dramatically until the maximum allowable turbine temperature is reached. The amount of time it takes to reach maximum allowable temperature is less, however, than the amount of time it takes the rotor assembly thermal growth to "catch up" to shroud thermal growth. As a result, the clearance between shroud and the rotor blade tips increases. The resulting inefficiency will decrease the available thrust until the engine reaches steady-state at which time the maximum available thrust will be produced. The time period between the call for maximum power and the time after which maximum power is available represents a lag in performance. A person of skill in the art will recognize that any lag in maximum power available is a serious detriment for a performance aircraft.

To avoid that undesirable lag, other control schemes use the pressure difference across the air inlet and the turbine exhaust to limit maximum permissible changes in power setting. Increasing the fuel flow rate within the combustors will cause an almost immediate increase in pressure within the turbine exhaust, and therefore in the pressure difference as well. As a result, the maximum possible thrust is available almost immediately. A disadvantage of this approach is that increasing the fuel flow rate to reach the desired pressure difference associated with maximum power during a transient period increases the core gas flow temperature within the turbine beyond the maximum permissible temperature associated with the desirable usable life of the turbine components. The extent to which the actual temperature exceeds the maximum permissible turbine temperature, and the duration of the exposure, depends upon the speed at which the turbine changes from transient state to steady state. Hence, both the performance and the life of the turbine components depend upon the thermal growth characteristics of the turbine rotor assemblies and shroud.

DISCLOSURE OF THE INVENTION

It is, therefore, an object of the present invention to provide a rotor blade outer tip seal apparatus that improves sealing between the blade tips of a rotor assembly and the shroud of the assembly.

It is another object of the present invention to provide a rotor blade outer tip seal apparatus that accommodates thermal expansion within a rotor assembly.

It is still another object of the present invention to provide a rotor blade outer tip seal apparatus that increases the efficiency of the turbine engine.

It is still another object of the present invention to provide a rotor blade outer tip seal apparatus that improves the durability of the rotor assembly.

According to the present invention, a shroud for a rotor assembly disposed within a case is provided. The shroud includes a suspension means, a control ting, and a blade outer air seal. The suspension means is disposed between the control ring and the case. The control ring includes a body and a first attachment means. The blade outer air seal includes a second attachment means. The first and second attachment means cooperate to secure the blade outer air seal to the control ring.

In one aspect of the present invention, the body includes a first thermal zone and a second thermal zone.

In another aspect of the present invention, the suspension means includes a hoop and spring means, the latter having a plurality of cantilevered leaves, each leaf having a length, a width, and a thickness. Each leaf extends lengthwise substantially parallel to the hoop, and the control ring is fastened to the cantilevered leafs.

An advantage of the present invention is that the sealing between the blade tips of the rotor assembly and the shroud of the assembly is improved. The thermal response of the present invention shroud is tailored to the thermal response of the rotor assembly. As a result, disparities in thermal response are minimized or eliminated and a more uniform gap is provided.

Another advantage of the present invention is that the efficiency of the engine is enhanced. The uniformity provided to the gap between the blade tips and the shroud by the present invention increases the efficiency of the engine by permitting the deployment of a smaller gap. The present invention also enhances efficiency by consistently maintaining a particular gap. The thermal response of the shroud is tailored to that of the rotor assembly to minimize or eliminate fluctuations in the gap therebetween.

Still another advantage of the present invention is that the durability of the rotor assembly is improved. The present invention provides a more uniform gap between the shroud and the rotor assembly and therefore avoids contact between the two. Contact between the shroud and the rotor blades can cause premature wear or failure. Durability is also improved within an engine controlled by a pressure difference scheme because turbine components exposure to undesirable temperatures is minimized.

Still another advantage of the present invention is an improvement in performance for an engine controlled under a turbine temperature control scheme. The tailored thermal response of the rotor assembly and the shroud minimizes gap variations therebetween. The period of time between when the core gas flow reaches the maximum temperature allowable, and the time it takes the thermal response of the rotor assembly and the shroud to become uniform, is therefore minimized and the inefficiencies associated with that time period minimized as well.

These and other objects, features and advantages of the present invention will become apparent in light of the detailed description of the best mode embodiment thereof, as illustrated in the accompanying drawings.

BEST MODE FOR CARRYING OUT THE INVENTION

I. Description of the Apparatus

Figure 1:
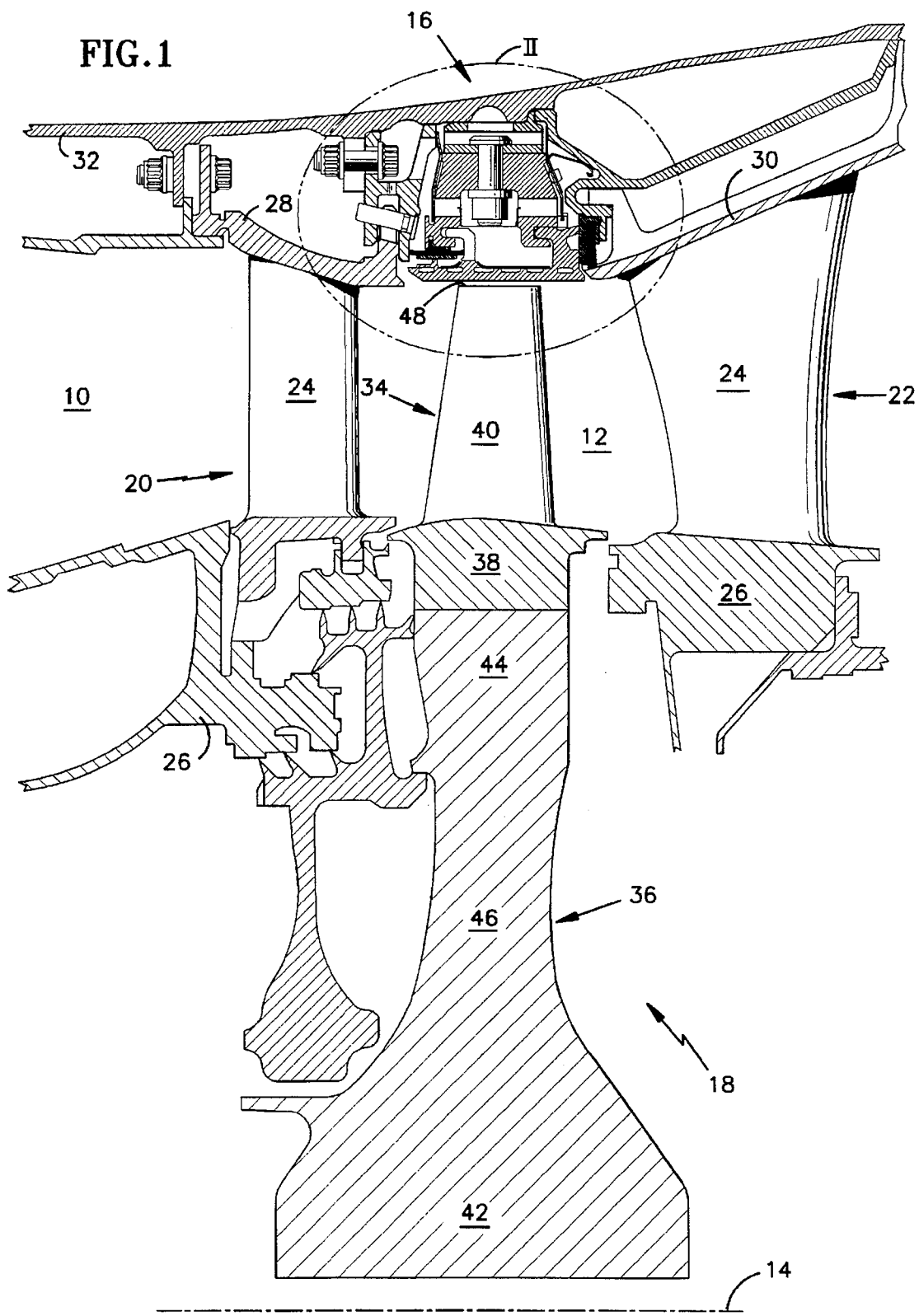
FIG. 1 is a sectional diagrammatic view of a turbine section.
Figure 2:
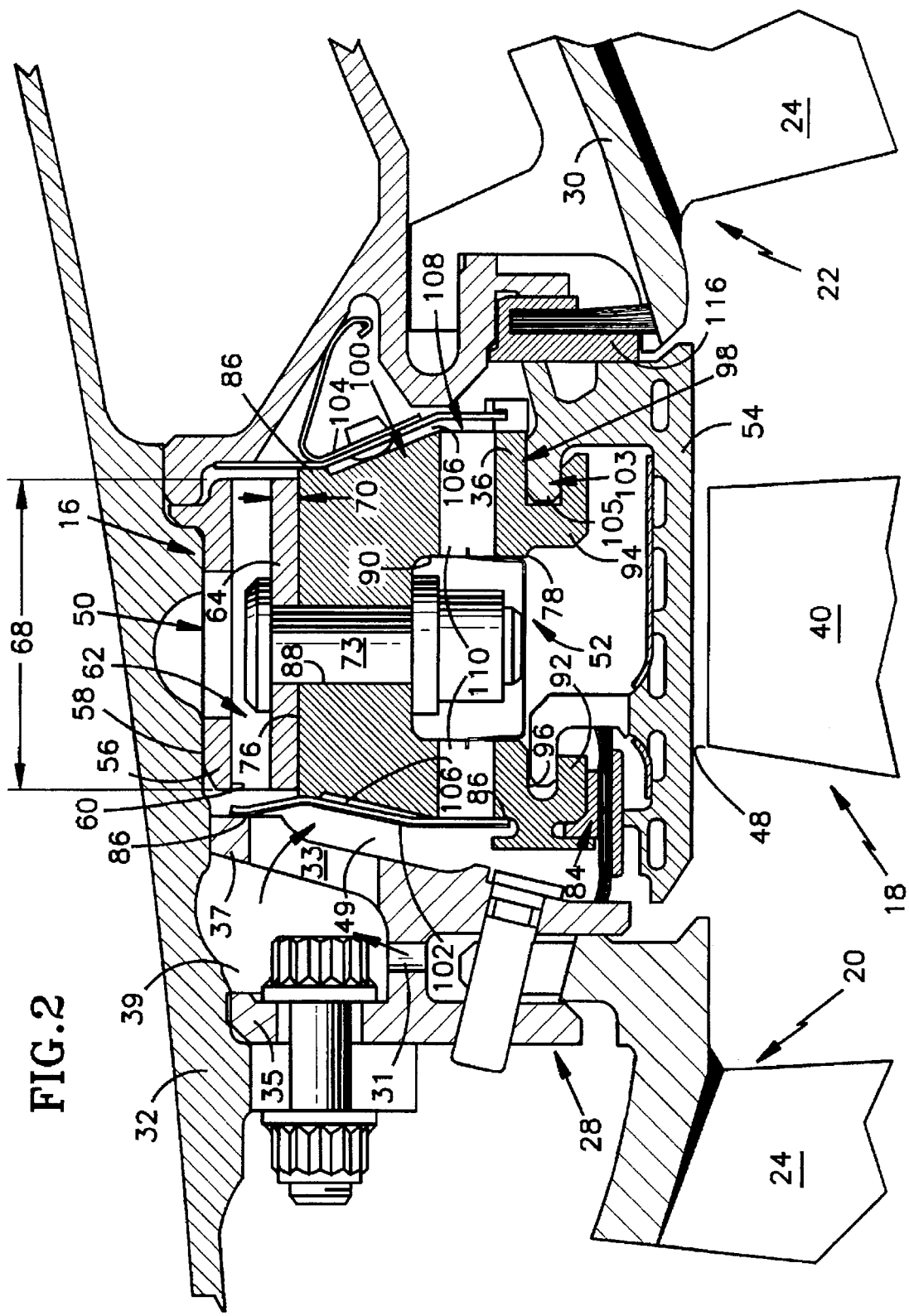
FIG. 2 is a magnified view of the shroud shown in FIG. 1.

Referring to FIG. 1, a gas turbine engine having a fan (not shown), a compressor (not shown), a combustor 10, and a turbine 12 disposed along a common longitudinal axis 14, includes a shroud 16 for sealing within the turbine 12. The turbine 12 includes a rotor assembly 18 disposed between forward 20 and aft 22 stationary vane assemblies. Each vane assembly 20,22 includes a plurality of vanes 24 circumferentially disposed around an inner vane support 26. The vanes 24 of each assembly 20,22 extend between the inner vane support 26 and an outer vane support 28,30. The outer vane supports 28,30 are attached to the diffuser case 32. For the sake of clarity, the outer vane supports 28,30 of the forward 20 and aft 22 vanes hereinafter will be referred to as the forward 28 and aft 30 outer vane supports, respectively. The forward outer vane support 28, as shown in FIG. 2, includes a plurality of first vent apertures 31, a plurality of second vent apertures 33, a first leg 35, and a second leg 37. The cross-sectional area of each first vent aperture 31 is substantially less than the cross sectional area of each second vent aperture 33. The first 35 and second 37 legs form an annulus 39 with the diffuser case 32.

The rotor assembly 18 includes a plurality of blades 34 circumferentially disposed around a disk 36, each blade 34 including a root 38 and an airfoil 40. The disk 36 includes a hub 42 and a rim 44, and a web 46 extending therebetween. The roots 38 are received within the rim 44 of the disk 38 and the airfoils 40 extend radially outward. The outer radial surface 48 of each airfoil 40 may be referred to as the tip of the blade.

Figure 3:
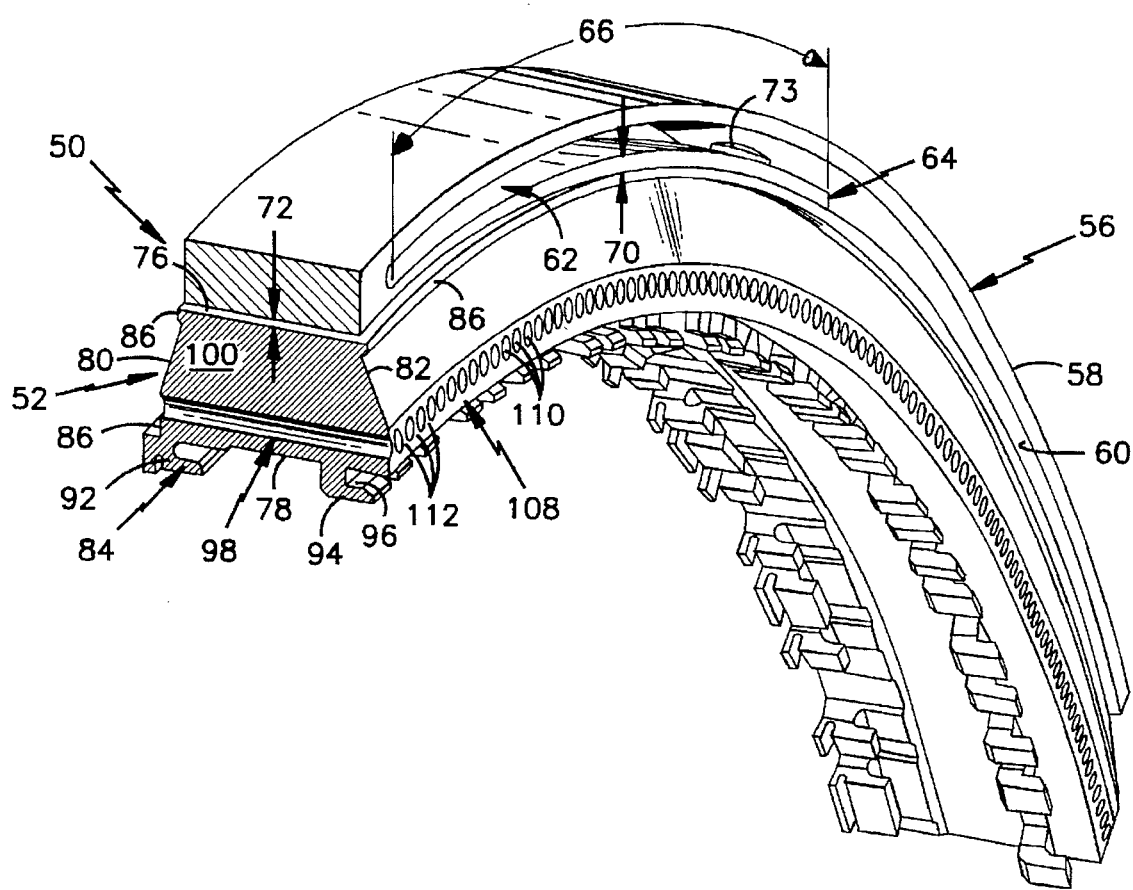
FIG. 3 is a perspective view of a portion of the shroud.

Referring to FIGS. 2 and 3, the shroud 16 is disposed in an annulus 49 radially between the diffuser case 32 and the blade tips 48 of the rotor assembly 18, and axially between the forward 28 and aft 30 outer vane supports. Locating the shroud 16 between the forward 28 and aft 30 outer vane supports minimizes or eliminates loading on the shroud 16 from either vane assembly 20,22. The shroud 16 includes a suspension means 50, a control ring 52, and a blade outer air seal 54. The suspension means 50 includes a hoop 56 with an outer 58 and an inner 60 radial surface, and spring means 62 attached to the inner radial surface 60. The suspension means 50 is fixed within the diffuser case 32 by a press fit between the outer radial surface 58 and the diffuser case 32. The spring means 62 includes a plurality of cantilevered leaves 64, each having a length 66, a width 68 (see FIG. 2), and a thickness 70. The leaves 64 extend out from the inner radial surface 60, in the same direction, every 45° around the circumference of the hoop 56. Each leaf 64 extends lengthwise adjacent the inner radial surface 60, diverging an amount 72 (see FIG. 3) radially inward away from the hoop 56. The leaves 64 may be described as having a radial spring rate ($K_R$), an axial spring rate ($K_A$), and a circumferential spring rate ($K_C$). The magnitude of the three spring rates may be altered to suit different applications. In the best mode, the radial spring rate is more compliant than the axial spring rate, and the axial spring rate is more compliant than the circumferential spring rate.

Referring to FIGS. 2 and 3, the control ring 52 includes a body having an outer 76 and an inner 78 radial surface, a forward surface 80, an aft surface 82, a first attachment means 84 for attaching the blade outer air seal 54 (see FIG. 2), and a plurality of bosses 86 extending outward from the forward 80 and aft 82 surfaces. Counterbored apertures 88 (see FIG. 3) are disposed around the circumference of the control ring 52, spaced to coincide with the leaves 64 of the suspension means 50. The counterbores 90 are disposed in the inner radial surface 78 and the apertures 88 extend between the counterbores 90 and the outer radial surface 76. Nut and bolt assemblies 73 are received within the apertures 88 to attach the control ring 52 to the cantilevered leaves 64 of the suspension means 50. The first attachment means 84 includes a plurality of forward 92 and aft 94 flanges extending out from the inner radial surface 78. The flanges 92,94 are shaped such that they form a sideways "U" shape with the inner radial surface 78, having an open slot 96 for receiving the blade outer air seal 54 as will be discussed infra.

The control ring 52 further includes a first thermal zone 98 and a second thermal zone 100. The thermal zones 98,100 differ from one another in that they expand and contract at different rates. In other words, during a time period necessary to change the control ring 52 from a steady-state dimension at a first temperature to a steady-state dimension at a second temperature, the first thermal zone 98 will reach a steady-state dimension before the second thermal zone 100 will reach a steady-state dimension. In the present invention, several features help create the difference in thermal response within the two thermal zones 98,100. Those features include: 1) different geometric configurations; 2) one zone more insulated than the other zone; and 3) means for inhibiting the flow of thermal energy between the two zones.

The first feature is accomplished by making the first thermal zone 98 relatively thin and considerably less massive than the second thermal zone 100. As a result, thermal energy permeates the first thermal zone 98 in less time than it takes thermal energy to permeate the second zone 100.

Referring to FIG. 2, the second feature is accomplished by implementing forward 102 and aft 104 heat shields, disposed forward and aft of the second thermal zone 100 of the control ring 52 respectively. The heat shields 102,104 are secured to the control ring 52 by a plurality of tabs (not shown) that are received by the control ring along both the forward and aft surfaces. The bosses 86 extending out from the control ring 52 maintain a gap 106 between the heat shields 102,104 on the respective sides of the control ring 52. Air or other insulative material fills the gap 106.

The third feature is accomplished by providing means 108 for inhibiting the flow of thermal energy between the thermal zones 98,100. The means 108 for inhibiting the flow of thermal energy between the thermal zones 98,100 includes a plurality of apertures 110 extending between the forward 80 and aft 82 surfaces of the control ting 52 which separate the first 98 and second thermal zones 100. The tendons 112 between the apertures 110 connect the two thermal zones 102,104. The apertures 110 contain air or other insulative material.

The difference in thermal response within the two thermal zones 98,100 may also be created by using a first material in the first thermal zone 98 and a second material in the second material zone 100, where the first and second materials have different thermal properties.

The blade outer air seal 54 includes a body and a second attachment means 103. The second attachment means 103 includes a plurality of flanges 105 that cooperate with the forward 92 and aft 94 flanges of the first attachment means 84 to secure the blade outer air seal 54.

II. Operation of the Apparatus

During operation of the engine, air bled off of either the fan (not shown) or the compressor (not shown) is passed through the diffuser case 32 to the shroud 16 to maintain the shroud 16 at a lower temperature than that of the core gas flow passing through the engine. The bled air is only relatively cooler, however. The bled air has been worked by the fan alone or by both the fan and the compressor and is therefore at an elevated pressure and temperature relative to air entering the engine. To explain further, the pressure and temperature of the bled air is a function of engine speed. An increase in engine speed will increase the amount of work imparted to the air within the fan and compressor, and therefore the temperature and pressure of the bled air. Conversely, a decrease in engine speed will decrease the amount of work in the bled air as well as the temperature and pressure of the bled air. Whether and how much the bled air heats or cools the shroud 16 elements, therefore, depends on the direction of the power setting change and the magnitude of change in the power setting of the engine.

Referring to FIG. 2, in instances of acceleration, air worked to an increased temperature and pressure by the fan and/or compressor sections is bled off and subsequently passed through the diffuser case 32. Before entering the annulus 49 containing the shroud 16, the bled air passes through the plurality of first vent apertures 31 disposed within the forward outer vane support 28. The cross-sectional area of the first vent apertures 31 is small enough to create a substantial pressure difference across the first vent apertures 31. The pressure difference drives the bled air through the first vent apertures 31 at a relatively high velocity into the annulus 39 formed by the forward outer vane support 28. From there, the bled air passes through the plurality of second vent apertures 33 and into the annulus 49 containing the shroud 16. The cross-sectional area of the second vent apertures 33 is large enough to create little or no pressure difference across the second vent apertures 33. Hence, the first 31 and second 33 vent apertures, in combination with the annulus 39 formed by the forward outer vane support 28, act as a diffuser to: 1) provide a pressure difference between the bled air within the diffuser case 32 and the bled air within the annulus 49 surrounding the shroud 16; and 2) decrease the velocity of the bled air entering into the annulus 49 surrounding the shroud 16. Decreasing the velocity of the bled air reduces convective heat transfer between the air and the shroud elements.

After entering the annulus 49 surrounding the shroud, the air is deflected away from both the suspension means 50 and the second thermal zone 100 of the control ring 52 by the forward 102 and aft 104 heat shields. The heat shields 102,104 prevent direct convective heat transfer between the air and the control ring 52. The heat shields 102,104 also maintain the gap 106 along the forward 80 and aft 82 surfaces and protect the insulative material disposed in the gap 106.

Air directly entering the annulus 49 adjacent the first thermal zone 98, or air within the annulus 49 deflected away from the second thermal zone 100 toward the first thermal zone 98, freely accesses the first thermal zone 98 of the control ring 52. As a result, the first thermal zone 98 transfers thermal energy predominantly by convection at a relatively high rate. The second thermal zone 100, insulated from the air by the heat shields 102,104, the insulative medium between the heat shields 102,104, and the heat transfer inhibiting means 108 between the two thermal zones, in contrast, is protected from the bled air and has a relatively low rate of heat transfer. In fact, thermal energy is transferred to the second thermal zone 100 predominantly by conduction through the heat shields 102,104 and into the bosses 86 or insulative medium, or through the tendons 112 between the apertures 110 extending between the thermal zones 102,104. The tendons 112 provide a minimal path between the two thermal zones 102,104 for the conduction of thermal energy and the air or other insulative material within the apertures 110 between the two zones 102,104 impedes the conduction of thermal energy.

Figure 5:
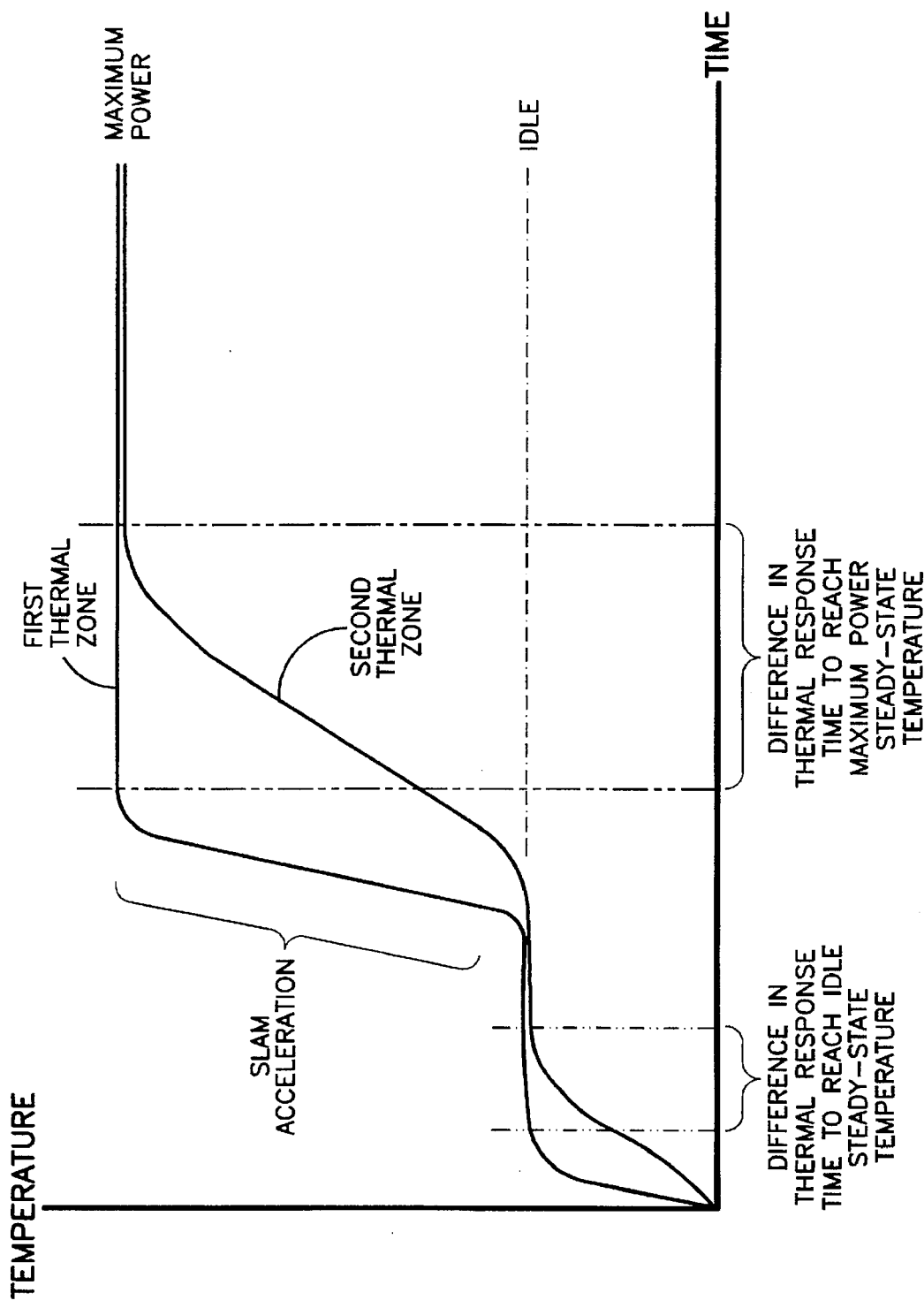
FIG. 5 is a graph illustrating the difference in thermal response versus time for the first and second thermal zones.

FIG. 5 illustrates the difference in thermal response between the first and second thermal zones. From start up to idle or from idle to maximum power, the first thermal zone 98 reaches a steady-state temperature dictated by the bled gas. Some period of time later, the second thermal zone also reaches a steady-state temperature. How long it takes each thermal zone to reach its steady-state temperature, and therefore dimension, at a particular temperature is a design criteria for the application at hand. The goal is to match the thermal response of the shroud with that of the rotor assembly 18, such that interference is avoided and gaps between the blade tips 48 and the blade outer air seal 54 are maintained at a minimum, using the methods described heretofore. Accordingly, a temperature\time or radial dimension\time graph for the rotor assembly 18 would be similar to that shown in FIG. 5.

In instances of deacceleration, the process is the same as that described for acceleration except that the bled air is initially cooler than the shroud 16 and therefore acts as a heat sink, removing heat from shroud 16. In the same manner as that described for acceleration, the thermal zones 98,100 of the control ring 52 act to slow the contraction (as opposed to the expansion) of the shroud to prevent an interference condition. After a period of time, the change in the rate of the heat transfer from the shroud 16 to the bled air approaches zero and the shroud 16 assumes a steady-state temperature.

Although it is an important aspect of blade clearance control, matching the thermal response of the shroud with that of the rotor assembly 18 will not, by itself, ensure that proper blade tip 48 to blade outer air seal 54 clearance is always maintained. On the contrary, matching the thermal characteristics of the shroud 16 to that of the rotor assembly 18 assumes that heating and cooling cycles are uniform around the circumference of the shroud 16. In fact, it is common to have non-uniform heating and cooling within the shroud 16 and diffuser case 32, and therefore a lack of concentricity with the rotor assembly 18. In addition, gas turbine engines mounted on aircraft are typically subjected to gravitational forces during maneuvers. This is particularly true in performance aircraft. Gravitational forces and vane assembly loading can force the diffuser case 32, and/or a blade clearance control system mounted therein temporarily out of round, or out of center relative to one another.

The present invention resolves these issues by 1) mounting the shroud 16 in an annulus 49 between the forward 28 and aft 30 outer vane supports, independent of the outer vane supports 28,30; and 2) by providing a suspension means 50 having a spring means 62. Mounting the shroud 16 in the annulus 49 between the forward 28 and aft 30 outer vane supports, independent of the vane supports as been described heretofore, enables the loading on the vane supports 28,30 to be transferred directly to the diffuser case 32 rather than the shroud 16 of the present invention. As a result, the shroud 16 responds more effectively to both uniform and non-uniform deflections of and/or loads on the rotor assembly 18.

Figure 4:
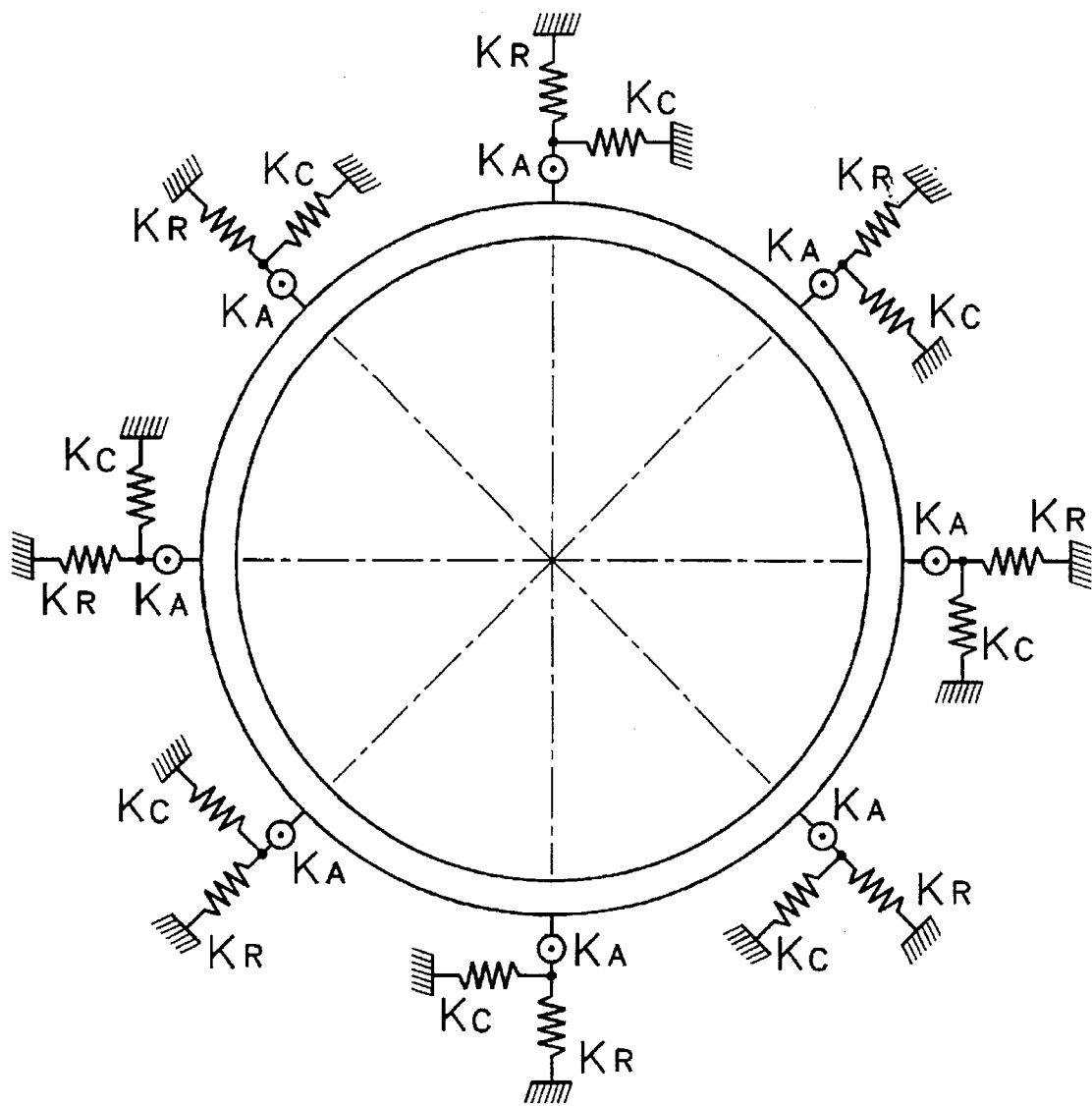
FIG. 4 is a schematic diagram of the suspension means within the shroud.

The spring means 62 of the suspension means 50 accommodates both uniform and non-uniform loading by suspending the control ring 52 and the blade outer air seal 54 radially, axially, and circumferentially. Radial growth or contraction of the control ring 52 is accommodated by thickness-wise deflection of the cantilevered leaves 64. If the radial growth or contraction of the control ring 52 is non uniform, or if the diffuser case 32 is deformed out of round, the cantilevered leaves 64 disposed around the circumference of the suspension means 50 deflect where appropriate to minimize or eliminate the effect of the eccentricity on the gap between the blade tips 48 and the blade outer air seal 54. FIG. 4 illustrates the circumferential distribution of the radial spring components ($K_R$) of the spring means 62 that allow for uniform and non-uniform loading.

Axial forces imparted to the shroud 16 by a distortion in the diffuser case 32 or by gravitational forces are accommodated by width-wise deflection of the cantilevered leaves 64. In addition, widthwise deflection of the cantilevered leaves 64 provides a biasing force to maintain the blade outer air seal 54 in place. An interference fit between an aft outer vane support seal assembly 116 and the blade outer air seal 54 applies a forward axial force against the control ring 52, which is resisted by the cantilevered leaves 64. FIG. 4 illustrates the circumferential distribution of the axial spring components ($K_A$-shown perpendicular to the plane of the page) of the spring means 62 that allows for uniform and non-uniform loading.

Circumferential forces acting on the control ring 52 are accommodated by length-wise deflection of the cantilevered leaves 64. Cantilevered leaves 64 disposed on opposite sides of the suspension means 50 ensure the control ring 52 remains concentric with the rotor assembly 18 when circumferential forces are applied to the shroud 16. During aircraft maneuvers, the shroud 16 will experience gravitational loads in a particular direction in response to the maneuver implemented by the pilot. The uniform distribution of the cantilevered leaves 64 around the circumference of the suspension means 50, as can be seen schematically in FIG. 4, ensure that at least two cantilevered leaves 64 ($K_C$) will support the control ring 52, one in compression and one in tension, regardless of the direction of the gravitational force.

Although this invention has been shown and described with respect to the detailed embodiments thereof, it will be understood by those skilled in the art that various changes in form and detail thereof may be made without departing from the spirit and the scope of the invention. For example, the suspenion means 50 of the shroud 16 has been described as having eight cantilevered leaves 64. In alternative embodiments, there may be more or less than eight cantilevered leaves 64. In another example, the spring means 62 has been described as being attached to the suspension means 50. Alternatively, it may be advantageous to include the spring means 62 on the control ring 52, or independently disposed between the control ring 52 and the diffuser case 32. In still another example, the means 108 for inhibiting the flow of thermal energy between the thermal zones 98,100 is described in the best mode as a plurality of apertures 110 extending between the forward 80 and aft 82 surfaces of the control ring 52. Alternatively, the means may be an insulative material fixed between the two zones. In still another example, the forward outer vane support 28 includes apertures 31,33 and forms an annulus 39 that enables it to act as a diffuser for the bled air entering the annulus 49 surrounding the shroud 16. In alternative embodiments, it may be advantageous to have a diffuser independent of the forward outer vane support.

The best mode of the present invention has been disclosed using the example of a shroud 16 surrounding a rotor assembly 18 within the turbine section of a gas turbine engine. Alternatively, the shroud 16 may also be deployed around the periphery of a rotor assembly disposed in a compressor section of a gas turbine engine, or other rotor assembly exposed to high temperature fluid flow where sealing between the rotor assembly and the shroud is critical.

We claim:

1. A shroud for a rotor assembly disposed within a case, comprising:

a control ring, including a body having an inner radial surface, a forward and aft surface, and first attachment means extending out from said inner radial surface, wherein said body includes a first thermal zone and a second thermal zone;

means for compliantly suspending said control ring within the case, wherein said control ring is attached to said means for compliantly suspending; and a blade outer air seal, having second attachment means, wherein said first and second attachment means cooperate to attach said blade outer air seal to said control ring.

2. A shroud for a rotor assembly according to claim 1, wherein said means for compliantly suspending said control ring includes:

a hoop with an inner radial surface, fixed within the case; and a spring means, attached to said hoop inner radial surface and to said control ring.

3. A shroud for a rotor assembly according to claim 2, wherein said spring means comprises:

a plurality of cantilevered leaves, each leaf having a length, a width, and a thickness, wherein each said cantilevered leaf extends lengthwise substantially parallel to said hoop, and said control ring is fastened to said cantilevered leaves.

4. A shroud for a rotor assembly according to claim 3, wherein each of said cantilevered leaves includes a radial spring rate, an axial spring rate, and a circumferential spring rate, and said radial spring rate is more compliant than said axial spring rate, and said axial spring rate is more compliant than said circumferential spring rate.

5. A shroud for a rotor assembly according to claim 3, wherein one of said first or second thermal zones expands and contracts at a rate different than the other of said first or second thermal zones.

6. A shroud for a rotor assembly according to claim 5, wherein said control ring further comprises:

means for inhibiting the transfer of thermal energy between said first and second thermal zones.

7. A shroud for a rotor assembly according to claim 6, wherein said means for inhibiting the transfer of thermal energy between said first and second thermal zones includes a plurality of apertures extending between said forward and aft surfaces of said control ring, said apertures positioned between said first and second thermal zones.

8. A shroud for a rotor assembly according to claim 7, further comprising heat shields disposed adjacent said second thermal zone, along said forward and aft surfaces of said control ring, wherein said heat shields inhibit the transfer of thermal energy to, or from, said second thermal zone.

9. A shroud for a rotor assembly according to claim 8, further comprising insulative means disposed between said heat shields and said forward and aft surfaces of said control ring.

10. A shroud for a rotor assembly according to claim 9, further comprising:

a plurality of bosses, extending out from said forward and aft surfaces of said control ring, wherein said bosses separate said heat shields from said forward and aft surfaces of said control ring, and said insulative means is disposed between said heat shields and said forward and aft surfaces of said control ring.

11. A shroud for a rotor assembly according to claim 1, wherein said control ring further comprises:

means for inhibiting the transfer of thermal energy between said first and second thermal zones.

12. A shroud for a rotor assembly according to claim 11, wherein said means for inhibiting the transfer of thermal energy between said first and second thermal zones includes a plurality of apertures extending between said forward and aft surfaces of said control ring, said apertures positioned between said first and second thermal zones.

13. A shroud for a rotor assembly according to claim 12, further comprising heat shields disposed adjacent said second thermal zone, along said forward and aft surfaces of said control ring, wherein said heat shields inhibit the transfer of thermal energy to, or from, said second thermal zone.

14. A shroud for a rotor assembly according to claim 13, further comprising insulative means disposed between said heat shields and said forward and aft surfaces of said control ring.

15. A shroud for a rotor assembly according to claim 14, further comprising:

a plurality of bosses, extending out from said forward and aft surfaces of said control ring, wherein said bosses separate said heat shields from said forward and aft surfaces of said control ring, and said insulative means is disposed between said heat shields and said forward and aft surfaces of said control ring.

16. A shroud for a rotor assembly according to claim 15, wherein one of said first or second thermal zones expands and contracts at a rate different than the other of said first or second thermal zones.

17. A shroud for a rotor assembly according to claim 16, wherein said first thermal zone expands and contracts at a rate greater than said second thermal zone expands and contracts, such that during a time period necessary to change said control ring from a steady-state dimension at a first temperature to a steady-state dimension at a second temperature, said first thermal zone will reach a steady-state dimension before said second thermal zone will reach a steady-state dimension.

18. A shroud for a gas turbine rotor assembly disposed within a case, comprising:

a control ring, including a body having an inner radial surface, a forward and aft surface, and first attachment means extending out from said inner radial surface, wherein said body includes a first thermal zone and a second thermal zone;

means for compliantly suspending said control ring within the case, wherein said control ring is attached to said means for compliantly suspending; and a blade outer air seal, having second attachment means, wherein said first and second attachment means cooperate to attach said blade outer air seal to said control ring.

19. A shroud for a gas turbine rotor assembly according to claim 18, wherein said means for compliantly suspending said control ring includes:

a hoop with an inner radial surface, fixed within the case; and a spring means, attached to said hoop inner radial surface and to said control ring.

20. A shroud for a gas turbine rotor assembly according to claim 19, wherein said spring means comprises:

a plurality of cantilevered leaves, each leaf having a length, a width, and a thickness, wherein each said cantilevered leaf extends lengthwise substantially parallel to said hoop, and said control ring is fastened to said cantilevered leaves.

21. A shroud for a gas turbine rotor assembly according to claim 20, wherein each of said cantilevered leaves includes a radial spring rate, an axial spring rate, and a circumferential spring rate, and said radial spring rate is more compliant than said axial spring rate, and said axial spring rate is more compliant than said circumferential spring rate.

22. A shroud for a gas turbine engine rotor assembly according to claim 21, wherein said control ring further comprises:

means for inhibiting the transfer of thermal energy between said first and second thermal zones.

23. A shroud for a gas turbine engine rotor assembly according to claim 22, wherein said means for inhibiting the transfer of thermal energy between said first and second thermal zones includes a plurality of apertures extending between said forward and aft surfaces of said control ring, said apertures positioned between said first and second thermal zones.

24. A shroud for a rotor assembly according to claim 23, further comprising heat shields disposed adjacent said second thermal zone, along said forward and aft surfaces of said control ring, wherein said heat shields inhibit the transfer of thermal energy to, or from, said second thermal zone.

25. An apparatus for compliantly suspending a blade outer air seal within a case, comprising:

a control ring, having means for attaching the blade outer air seal;

a hoop with an inner radial surface, fixed within the case; and a plurality of cantilevered leaves, attached to said hoop inner radial surface and to said control ring, each said leaf having a length, a width, and a thickness, wherein each said cantilevered leaf extends lengthwise substantially parallel to said hoop, and said control ring is fastened to said cantilevered leaves.

26. An apparatus for compliantly suspending a blade outer air seal within a case according to claim 24, wherein each of said cantilevered leaves includes a radial spring rate, an axial spring rate, and a circumferential spring rate, and said radial spring rate is more compliant than said axial spring rate, and said axial spring rate is more compliant than said circumferential spring rate.

* * * * *

UNITED STATES PATENT AND TRADEMARK OFFICE
CERTIFICATE OF CORRECTION

PATENT NO.    : 5,639,210
DATED         : June 17, 1997
INVENTOR(S)   : Kevin D. Carpenter et al It is certified that error appears in the above-indentified patent and that said Letters Patent is hereby corrected as shown below:

```
In column 2 at line 61, change "ting" to --ring--.
In column 4 at line 24, change "disk 38" to --disk 36--.
In column 5 at line 43, change "ting" to --ring--.
In line 2 of claim 26, change "claim 24" to --claim 25--.
```

Signed and Sealed this

Twenty-eighth Day of April, 1998

*Attest:*

BRUCE LEHMAN

*Attesting Officer*  *Commissioner of Patents and Trademarks*